(12) United States Patent
Pallagatti Kotrabasappa et al.

(10) Patent No.: US 11,805,055 B2
(45) Date of Patent: *Oct. 31, 2023

(54) AUTO-CONFIGURATION OF ROUTES BETWEEN NEIGHBOR DEVICES

(71) Applicant: VMware, Inc., Palo Alto, CA (US)

(72) Inventors: Santosh Pallagatti Kotrabasappa, Bangalore (IN); Sami Boutros, Union City, CA (US); Jerome Catrouillet, Palo Alto, CA (US); George Mathew, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,355

(22) Filed: Mar. 1, 2022

(65) Prior Publication Data

US 2022/0224643 A1 Jul. 14, 2022

Related U.S. Application Data

(63) Continuation of application No. 17/008,781, filed on Sep. 1, 2020, now Pat. No. 11,265,246.

(30) Foreign Application Priority Data

Jun. 29, 2020 (IN) .............................. 202041027620

(51) Int. Cl.
*H04L 45/00* (2022.01)
*H04L 67/141* (2022.01)

(52) U.S. Cl.
CPC ............ *H04L 45/70* (2013.01); *H04L 67/141* (2013.01)

(58) Field of Classification Search
CPC ......... H04L 45/00; H04L 45/12; H04L 45/38; H04L 65/1101; H04W 8/005
See application file for complete search history.

(56) References Cited

U.S. PATENT DOCUMENTS

| 10,594,592 B1* | 3/2020 | Wang ...................... H04L 45/04 |
| 2006/0198322 A1* | 9/2006 | Hares ...................... H04L 45/02 370/254 |

(Continued)

OTHER PUBLICATIONS

John G. Scudder et al., "Capabilities Advertisement with BGP-4", Feb. 2009, 15 pages.

*Primary Examiner* — Kevin T Bates
*Assistant Examiner* — Emad Siddiqi
(74) *Attorney, Agent, or Firm* — Barta, Jones & Foley, PLLC

(57) ABSTRACT

In some embodiments, a method inserts, by a first computing device, a first value for a capability in a first message that is used in a process to automatically exchange capability values with a second computing device. The first value for the capability indicates the first computing device requires a default route to reach the second computing device as a next hop for sending a packet to a destination. The first computing device sends the first message to the second computing device; and receives a second value for the capability in a second message from the second computing device. The second value indicating the second computing device will send the default route to reach the second computing device. When the default route is received from the second computing device, the first computing device stores the default route from the second computing device in a route table.

20 Claims, 10 Drawing Sheets

(56) References Cited

U.S. PATENT DOCUMENTS

| | | | | |
|---|---|---|---|---|
| 2006/0209851 A1* | 9/2006 | Scudder | ............... | H04L 45/308 370/401 |
| 2010/0265956 A1* | 10/2010 | Li | ........................ | H04L 45/02 370/401 |
| 2011/0058545 A1* | 3/2011 | Eriksson | ................ | H04L 61/30 370/389 |
| 2013/0128888 A1* | 5/2013 | Zhang | ..................... | H04L 45/04 370/390 |
| 2014/0213191 A1* | 7/2014 | Courtice | .............. | H04L 45/125 455/67.11 |
| 2020/0396153 A1* | 12/2020 | Campora | ............... | H04L 45/04 |
| 2021/0136854 A1* | 5/2021 | Kuge | ................... | H04W 76/19 |

* cited by examiner

Route table
206-1

10.10.1.0/24 -> 172.10.1.2
10.20.1.0/24 -> 172.10.1.2
200.1.2.0/24 -> 25.10.1.1

Route table
206-2

10.10.1.0/24 -> 172.20.1.2
10.20.1.0/24 -> 172.20.1.2
200.1.2.0/24 -> 25.10.1.1

Route table
206-3

10.10.1.0/24 -> 172.30.1.2
10.20.1.0/24 -> 172.30.1.2
200.1.2.0/24 -> 25.10.1.1

Route table
206-4

AUTO-CONFIGURATION OF ROUTES BETWEEN NEIGHBOR DEVICES

RELATED APPLICATIONS

This application is a continuation of U.S. patent application Ser. No. 17/008,781 filed Sep. 1, 2020, now U.S. Pat. No. 11,265,246 and claims the benefit under 35 U.S.C. 119(a)-(d) to Foreign Application No. 202041027620 filed in India all entitled "AUTO-CONFIGURATION OF ROUTES BETWEEN NEIGHBOR DEVICES", on Jun. 29, 2020, all of which are incorporated by reference herein in their entireties for all purposes.

BACKGROUND

An access device may be coupled to a number of gateways. In some examples, the access device and gateways use a routing protocol, such as border gateway protocol, to exchange routing information. The access device and gateways exchange routing information when discovering neighbors (e.g., peers) on network segments. For example, an access device requires routing information to reach the gateways that are coupled to the access device as a next hop. In some examples, the access device only requires a default route (e.g., 0.0.0.0/0) to reach each gateway. The gateways may receive other more specific routes to reach other devices, but the access device does not require those specific routes. For example, one situation where the access only needs a default route is when the access device can use any one of multiple gateways to reach a destination. A routing strategy, such as equal cost multipath (ECMP), may be used in which the access device can select any of the gateways to reach a destination. When this routing strategy is used, the access device only requires a default route (e.g., 0.0.0.0/0) to reach each gateway. For example, when a default route is used to route a packet, the access device may select one of the gateways to reach that destination. Thus, the access device requires only the default route from each gateway, and not receiving the specific routes from the gateways reduces the amount of routes that are stored in a routing table and also reduce communication in a network.

Typically, the gateways advertise only the default route to the access device using two methods. In a first method, the default route is configured in each gateway and then the gateway is manually configured to advertise only the default route for the access device. In a second method, the default route is configured in each gateway manually and then the access device is manually configured to advertise a filter, such as an outbound route filter (ORF), to each gateway that would filter routes other than the default route from being sent to the access device. Both methods require manual configuration of either the gateways or the access device. When there is a large number of gateways, the manual configuration may be complex and time-consuming.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts an example of routing tables according to some embodiments.

DETAILED DESCRIPTION

Figure 1:
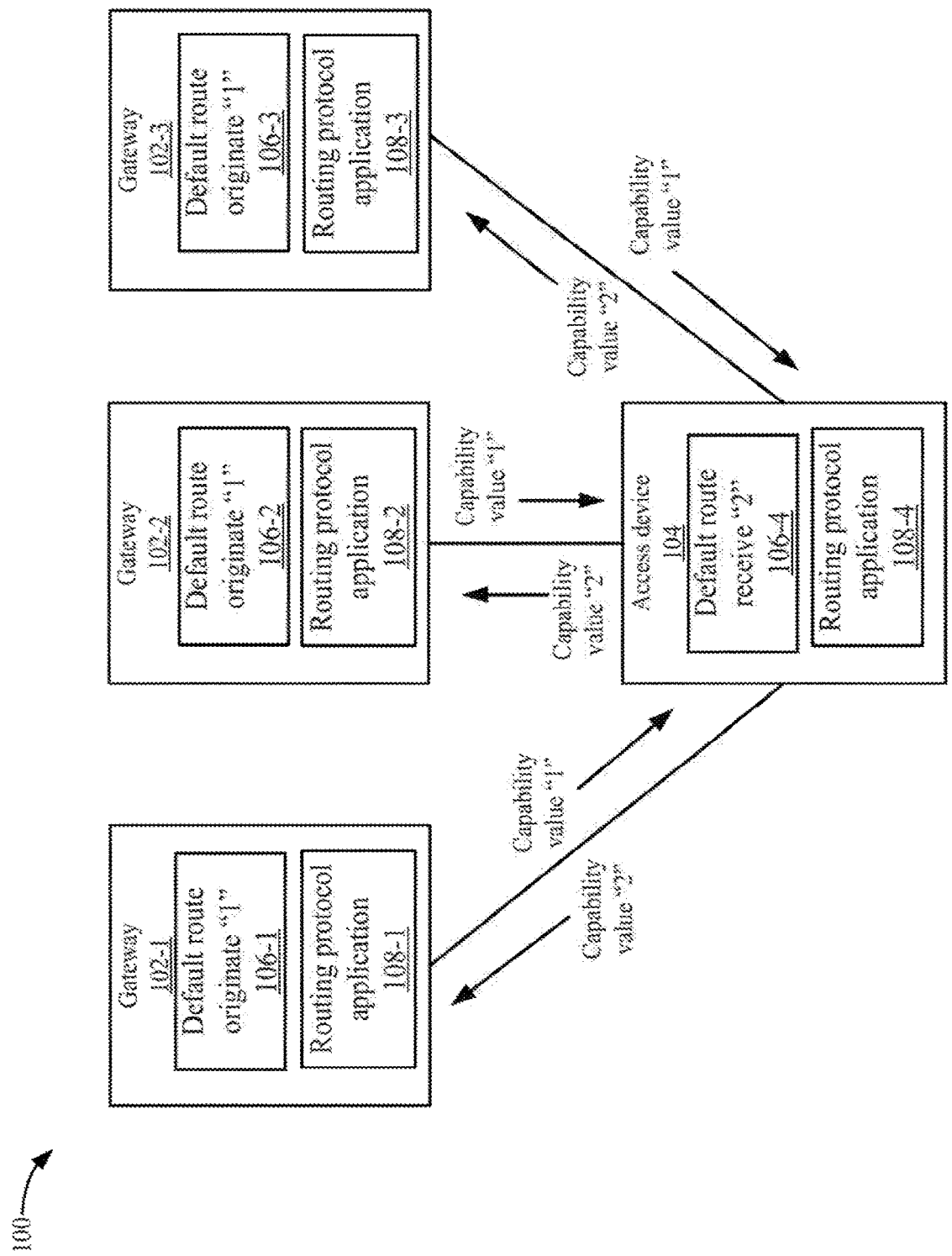
FIG. 1 depicts a simplified system for configuring devices in a network according to some embodiments.

In the following description, for purposes of explanation, numerous examples and specific details are set forth to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should not be construed as limiting in any way.

Routing protocols, such as border gateway protocol, are used by network devices to exchange routing and reachability information. The information may advertise routes to reach destinations via next hops. The routing protocols may use a process that allows network devices to automatically discover neighbors on network segments and exchange the routes to reach destinations without being manually configured to communicate. This process may include multiple parts, such as neighbor discovery and then opening of a session to exchange routing information. Some embodiments leverage part of the process to configure network devices, such as gateways and an access device, to advertise routes in a desired way through a capability exchange. In contrast to the Background, the process does not require the manual configuration of gateways or access devices to specifically communicate with each other to configure the settings to advertise routes. For example, in contrast to the two methods in the Background, the gateways do not need to be configured to advertise only a default route to a specific access device or an access device does not need to be configured to specifically communicate with a gateway to advertise a filter to use. Rather, a capability value is set in the gateways and a capability value is set in the access device that defines the desired configuration to advertise routes in each of the respective gateways and the access device.

Then, the gateways and access device can communicate the capabilities to configure the settings for route advertisement. For example, the gateways and the access device insert respective capability values to define routing information to advertise within messages that are exchanged in the process in which the gateways and the access device open a session between themselves. However, the exchange of capabilities may occur at other times and may not be part of opening the session. The automatic communication of the capabilities does not require configuring gateways and access devices to communicate with each other specifically to configure the route advertisement settings.

To configure the desired route advertisement settings, the gateways are configured with a first capability value that is set to a first value of "default route originate", which indicates a device that sent the message sends only the default route to the device that receives the message. Also, the access device is configured with the second capability value that is set to a second value of "default route receive", which indicates only a default route should be received from the device that sent the message. In some embodiments, to communicate the capability value, the capability value for a gateway and an access device may be set in a capability parameter that is defined in a protocol to negotiate various capabilities to be used in a session between a gateway and an access device. However, the capabilities may be communicated via other methods.

Upon a gateway receiving a message from the access device with the capability value set to the value of "default route receive", the gateway may configure itself to only send the default route to the access device that is identified in the message, and not any specific routes. Also, when the access device receives a message from a gateway with the capability value set to "default route originate", the access device knows that this gateway will only send the default route to reach the gateway (and not any specific routes) to the access device. Also, the access device can send specific routes to the gateway when the gateway sends this capability value. If the above capability values are communicated between the gateway and the access device, the gateway and the access device can confirm the configuration of the gateway for advertising the default route to the access device and the configuration of the access device for sending specific routes to the gateway is correct. The gateway and the access device thus perform the configuration process that is required without having to manually configure the communication between the access device and the gateway to configure the route advertisement settings. The automatic configuration may leverage part of the process to discover neighbors and open a session to exchange routing information.

System Overview

FIG. 1 depicts a simplified system 100 for configuring devices in a network according to some embodiments. System 100 includes one or more gateways 102-1 to 102-3 (collectively gateways 102) and an access device 104. Although three gateways are shown, different numbers of gateways may be used, such as one or more gateways. Gateways 102 and access device 104 may be network devices that route packets on network segments. For example, gateways 102 and access device 104 may be layer 3 routers. Gateways 102 and access device 104 include hardware resources including computer processor resources (not shown) memory resources (not shown) and input/output resources, including physical network interfaces ("PNICs") (not shown) that are used to route the packets. Gateways 102 may be the next hop layer 3 device for access device 104. For example, when access device 104 sends a packet to reach a destination, gateways 102 are the next hop to route the packet. Similarly, when gateways 102 send a packet to reach a destination, access device 104 is a next hop to route the packet.

The system depicted in FIG. 1 is simplified and other configurations may exist, such as any network configuration in which devices discover neighbors on network segments and require route advertisement settings may be used. For example, any network configuration where automatic discovery between devices occurs and in which only a default route needs to be communicated to a device may be appreciated. Some examples of possible network configurations include when access device 104 is an edge services gateway or when access device 104 is a load balancer. More detailed descriptions of different network configurations of system 100 are described below, such as in FIG. 2 and FIG. 3.

In a desired configuration, access device 104 may only require a default route from gateways 102, and gateways 102 require specific routes from access device 104. The default route is a route that defines a packet forwarding rule to use when no specific route can be determined for a given destination address of a packet. All packets for destinations not established in the routing table are sent via the default route. When using a longest prefix match to find a route in a route table, the default route may match when the shortest prefix length is used, such a prefix length of zero. A specific route is when a match occurs with a prefix length greater than the shortest possible. In some examples using a routing protocol of IPv4, the default route is 0.0.0.0/0 and a specific route may be 10.10.1.0/24. While IPv4 addressing is described hereby way of example, the principles described herein may be adapted for any Layer 3 addressing scheme, including IPv6.

Gateway 102-1 to gateway 102-3 include routing protocol applications 108-1 to 108-3 and access device 104 includes a routing protocol application 108-4. Routing protocol applications use a protocol to establish routing protocol sessions with the routing protocol applications on other devices to exchange routes for network reachability. That is, the routes specify next hops for destinations. The routes that are received may be inserted into route tables that are used to route packets to destinations via next hops.

Routing protocol applications 108 can perform a process to discover neighboring devices (e.g., peers) on network segments as defined by a protocol, such as link layer discovery protocol (LLDP), BGP (e.g., router advertisement (RA) or BGP hello messages), but other protocols may be used. During the process, gateways 102 and access device 104 are set to auto discover neighbors on network segments, such as the next hop layer 3 device. The process periodically sends messages, such as BGP HELLO messages, on interfaces on which BGP neighbor auto discovery are enabled. A peer that receives the HELLO messages may then establish a session that enables exchange of routing information between the neighbors such that each neighbor can reach each other. Although different parts of the process to discover neighbors and open a session are described when capability exchange occurs, it will be understood that capability exchange may occur during any time that capability negotiation occurs and is not limited to session establishment.

During the capability exchange process, access device 104 and gateways 102 negotiate their respective capability for advertising routes between each other. For example, the capability value may be inserted in a capability parameter in messages sent in the process to establish a session, such as in an OPEN message in BGP. The capability may indicate the configuration of how a respective device will advertise routes. In the process, routing protocol application 108-1 in gateway 102-1 may receive a capability value of the second value of "default route receive" from routing protocol application 108-4 in access device 104. Routing protocol application 108-1 then configures gateway 102-1 to only send the default route to access device 104. Also, routing protocol application 108-1 sends the capability value of gateway 102-1, such as the first value of "default route originate", to routing protocol application 108-4 of access device 104. Routing protocol application 108-4 checks the capability value to determine if gateway 102 is configured to only send the default route. For example, if gateway 102 sent a capability value other than "default route originate", then routing protocol application 108-4 may raise an exception that gateway 102 is not configured with the correct capability. If routing protocol application 108-4 receives the capability of "default route originate", routing protocol application 108-4 knows that gateway 102 will only send the default route and access device 104 can send the specific routes to gateway 102. Routing protocol application 108-4 can also set a filter to accept the default route and reject other routes from gateway 102.

The above configuration of capabilities happens automatically between gateways 102 and access device 104. Accordingly, gateways 102 do not need to be manually configured to set the default route originate configuration for access device 104. Alternatively, access device 104 does not need to be manually configured to communicate with each gateway 102 to have a filter set at gateway 102 to filter all routes except the default route. The above capability exchange automatically sets the configuration for a gateway 102 and the configuration for access device 104. Accordingly, a large amount of manual configuration is avoided using a capability value exchange for configuring the advertisement of the correct routes.

As discussed above, multiple network configurations may be appreciated. The following describes a first network configuration for an edge services gateway and a second configuration for a load balancer, but other configurations may be appreciated.

Edge Services Gateway

The following illustrates the use of default routes and specific routes in the edge services gateway configuration. Access device 104 uses a routing strategy, such as equal cost multipath routing (ECMP), to select a path to send a packet for a flow (e.g., a flow between a source and a destination) as a next hop. Here, the destination of the packet may be reached via any of gateways 102-1 to 102-3. The routing strategy may use a process to load balance flows across the paths to optimize bandwidth used across the paths. To use ECMP, access device 104 only needs a default route from each gateway 102. The default route is then associated with multiple IP addresses for gateways 102-1 to 102-3. When access device 104 does not find a specific route, access device 104 determines the default route is matched and that multiple next hop addresses (e.g., the IP addresses for gateways 102) are associated with the default route. Access device 104 then uses the routing strategy to select one of the IP addresses to send the packet. In some embodiments, the flow may be associated with this IP address such that all packets for the flow are sent through a specific gateway 102, but this may not be necessary. Once any gateway 102 receives the packet, that gateway 102 then sends the traffic to the next hop required to reach the destination of the packet. In the other direction, network traffic is routed through a gateway 102 to access device 104, which then forwards the packet back to the original source of the flow.

Figure 2:
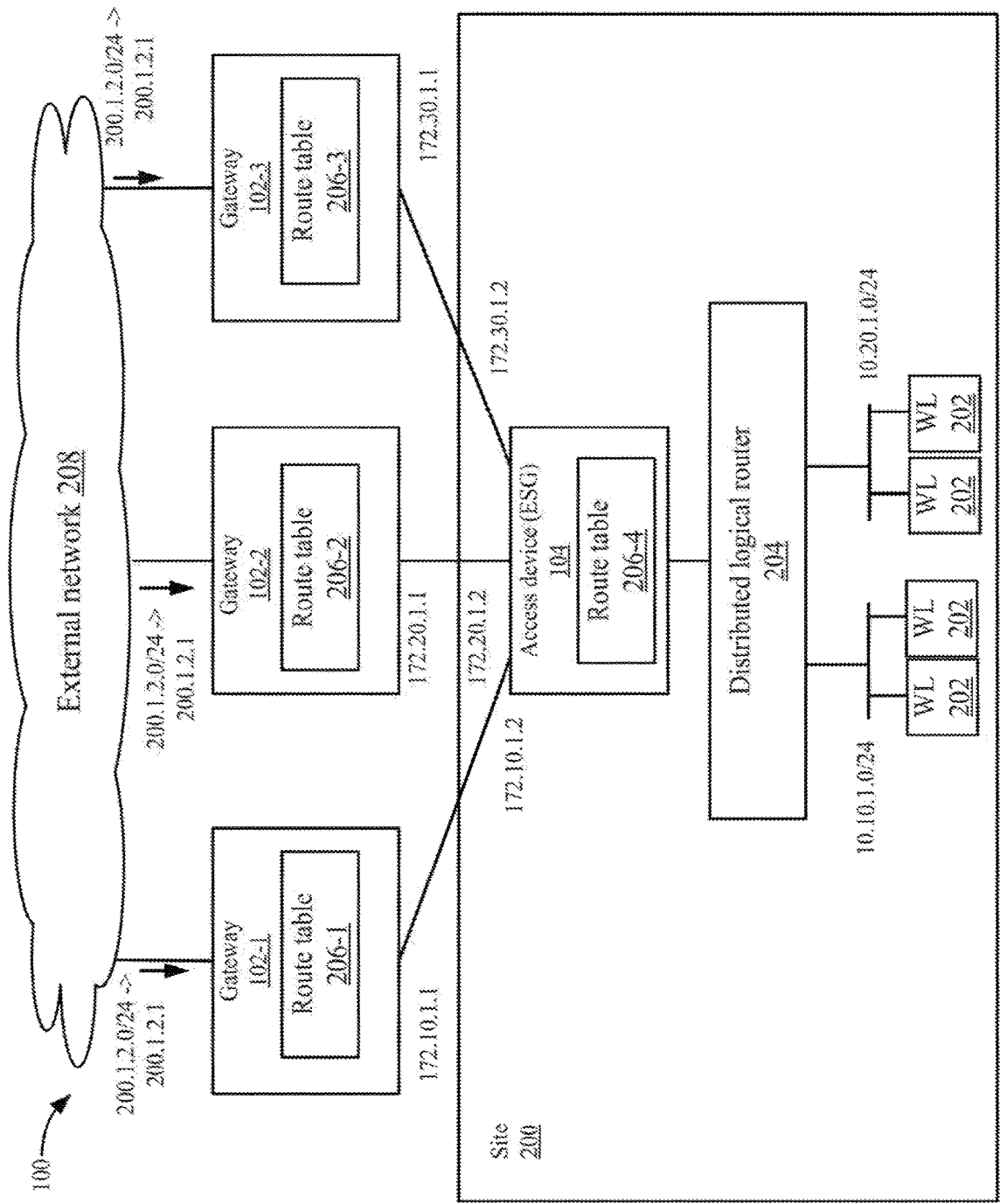
FIG. 2 depicts a logical example of system where an access device operates as an edge services gateway (ESG) according to some embodiments.

FIG. 2 depicts a logical example of system 100 where access device 104 operates as an edge services gateway (ESG) according to some embodiments. In some embodiments, access device 104 may be running in a site 200, which may be a data center. Gateways 102 may be the next hop for access device 104 to reach external network 208. Gateways 102 may be external to site 200 as shown, but may also be within site 200, such as in a top of the rack (TOR) server, that is used to reach external network 208. In both cases, gateways 102 are the next hop for access device 104 to reach external network 208. An edge services gateway may route traffic, which may be referred to as north/south traffic, from workloads 202 to gateways 102. The edge services gateway may be implemented in different ways, such as in a workload running in a host, or on bare metal in a server. Hosts include hardware resources including computer processor resources (not shown) memory resources (not shown) and input/output resources, including physical network interfaces (PNICs") (not shown). Hosts may also run virtualization software (e.g., a hypervisor) that host workloads.

Workloads may refer to virtual machines that are running on a respective host, but this is one example of a virtualized computing instance or compute node. Any suitable technology may be used to provide a workload. A workload may be a virtual machine or a container (e.g., running on top of a guest operating system or a host operating system without the need for a hypervisor or separate operating system or implemented as an operating system level virtualization) or other similar technologies. In the case of a virtual machine, the workload may also be a complete computation environment containing virtual equivalents of the hardware and software components of a physical computing system. Also, as used herein, the term "hypervisor" may refer generally to a software layer or component that supports the execution of multiple workloads. Although a virtualized environment is described, some embodiments may be used in an environment that is not virtualized. Also, the term "workload" may refer to a host that is not virtualized.

Workloads may be located on different network segments (e.g., Layer 2 segments or subnets). For example, a first subnet is assigned a range of IP addresses of "10.10.1.0/24" and a second subnet is assigned a range of IP addresses of "10.20.1.0/24". Distributed logical router 204 may route traffic between workloads in different subnets or between workloads 202 and access device 104. Distributed logical router may include a distributed component that is distributed across hosts running workloads 202. Further details of logical routers and logical switches are described in U.S. Pat. No. 9,369,426, entitled "DISTRIBUTED LOGICAL L3 ROUTING", filed Aug. 17, 2012, which claims priority to U.S. provisional application No. 61/524,754, filed on Aug. 17, 2011, U.S. provisional application No. 61/643,753394, filed on May 6, 2012, U.S. provisional application No. 61/654,121, filed on Jun. 1, 2012, and U.S. provisional application No. 61/666,876, filed on Jul. 1, 2012, all which are incorporated by reference in their entirety. Another example implementation of this type of logical router architecture is described in detail in U.S. Pat. No. 9,787,605, granted Oct. 10, 2017, which is also incorporated herein by reference in its entirety. Even though distributed logical router 204 is discussed, router 204 may not use virtualization.

In some configurations, each gateway 102 is coupled to access device 104 via an interface. For example, gateway 102-1 includes an interface with an IP address of "172.10.1.1" that is coupled to access device 104 at an interface with the IP address of "172.10.1.2". Gateway 102-2 includes an interface with an IP address of "172.20.1.1" that is coupled to access device 104 at an interface with the IP address of "172.20.1.2". Also, gateway 102-1 includes an interface with an IP address of "172.30.1.1" that is coupled to access device 104 at an interface with the IP address of "172.30.1.2". It is noted that different connections between access device 104 and gateways 102 may be used, such as there may be multiple connections to one gateway 102.

In some embodiments, the workloads may communicate with external destinations (e.g., client devices or external devices) outside of the site 200. Any of gateways 102 may be used to reach the destination. As discussed above, access device 104 may use a routing strategy, such as equal cost multipath routing, to select a path to send a packet for a flow as a next hop. Here, the destination of the packet may be reached via any of gateways 102-1 to 102-3.

Gateway 102-1 to gateway 102-3 may have a route table 206-1 to 206-3, respectively, to route packets to destinations via Layer 3. Route tables 206-1 to 206-3 may store specific routes to reach devices via external network 208. For example, route tables 206-1 to 206-3 may store specific routes to reach other routers. For example, gateways 102 may receive a specific route of "200.1.2.0/24->200.1.2.1". The specific route indicates a next hop of a device with the address of "200.1.2.1". Gateways 102 use the next hop when routing a packet to a destination in the subnet of "200.1.2.0/24". Gateways 102 store the specific routes in respective route tables 206.

Access device 104 includes a route table 206-4 that is used to route packets to destinations via Layer 3. As discussed above, gateways 102 require the specific routes to route packets to the workloads 202, but access device 104 does not require the specific routes from gateways 102. Rather, access device 104 only requires a default route from gateways 102.

FIG. 3 depicts an example of routing tables 206 according to some embodiments. Route tables 206-1 to 206-3 include similar entries such that access device 104 can reach any destination via each gateway 102. For example, a specific route for the range of IP addresses "200.1.2.0/24" includes a next hop of an IP address of "25.10.1.1". The IP address of "25.10.1.1" is the next hop to reach a device in the subnet for the range of IP addresses of "200.1.2.0/24". Gateways 102 may receive the route via a routing process with the next hop device, via a process between themselves, or another way.

Gateways 102 also include specific routes for the subnets coupled to access device 104. For example, access device 104 advertises the specific routes to gateways 104. Since gateways 104 are connected to different interfaces of access device 104, the specific routes are different. Route table 206-1 includes specific routes for the subnets "10.10.1.0/24" and "10.20.1.0/24" to the IP address of "172.10.1.2". Route table 206-2 includes specific routes for the same subnets to the IP address of "172.20.1.2" and route table 206-3 includes specific routes for the same subnets to the IP address of "172.20.1.2". Using route tables 206-1 to 206-3, respective gateways 102-1 to 102-3 can route packets to the next hop of access device 104 for packets that have a destination in the subnets "10.10.1.0/24" and "10.20.1.0/24".

Access device 104 includes the default route of "0.0.0.0/0", which includes the next hop of IP addresses "172.10.1.1/24, 172.20.1.1/24, 172.30.1.1/24" for gateways 102-1 to 102-3. When the default route is matched, access device 104 may use the routing strategy (e.g., ECMP) to select one of the gateways 102 as the next hop. When access device 104 receives a packet with a destination of "200.1.2.1", access device 104 sends the packet to one of gateways 102 using the routing strategy. Access device 104 does not need the specific route of "200.1.2.0/24->25.10.1.1" from gateways 102 for the packet to be routed to the destination because any gateway 102 can route the packet to the next hop of "25.10.1.1". Accordingly, gateways 102 may not be configured to not send the specific routes to access device 104 to avoid unnecessary entries in route table 206-4 and unnecessary communication. Gateways 102 and access device 104 can be configured such that gateways 102 only send a default route to access device 104 using the capability value exchange as described herein.

Load Balancer

Figure 4:
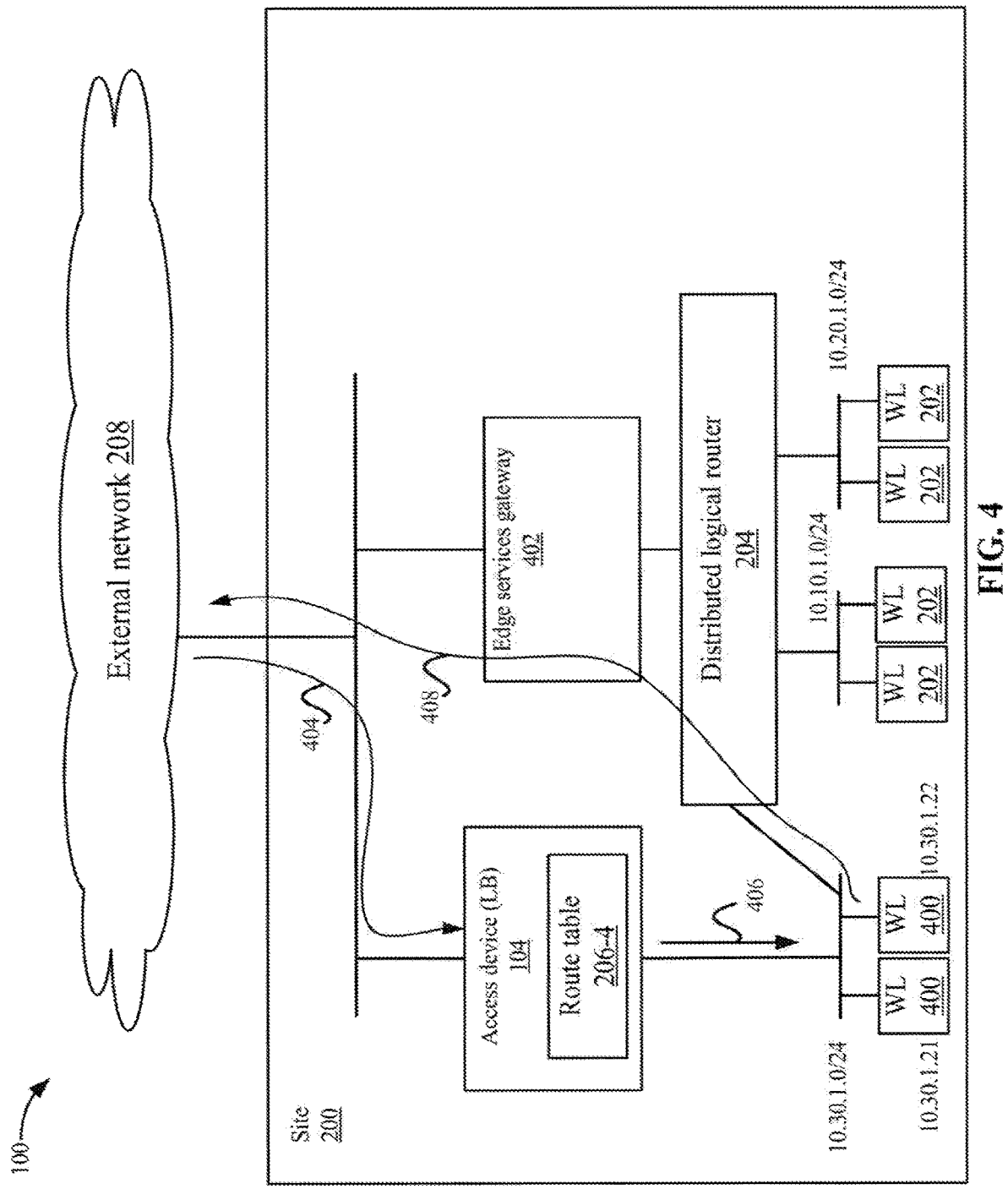
FIG. 4 depicts a logical example of system where the access device operates as a load balancer (LB) according to some embodiments.

Also, access device 104 may be a load balancer that performs load balancing for the workloads. FIG. 4 depicts a logical example of system 100 where access device 104 operates as a load balancer (LB) according to some embodiments. Access device 104 may be installed parallel to edge services gateway 402. For example, access device 104 may be installed on hosts, such as in a workload, in an edge rack that is running edge services gateway 402. Edge services gateway 402 may perform similar functions as described above in FIG. 2 to route packets to and from workloads 202. Although access device 104 and edge services gateway 402 are described as separate devices, in other embodiments, access device 104 may perform functions of edge services gateway 402, or may be combined with edge services gateway 402. In these cases, access device 104 may perform some routing functions and receives only the default route from gateways 102. Access device 104 may load balance flows between workloads 400. For example, when a packet for a flow is received for a service, such as a web server, access device 104 may select one of workload 400 to process the flow for the packet.

In some embodiments, access device 104 processes north-south traffic flows. That is, clients (not shown) may send packets via external network 208 to access device 104 via path 404. To enable the sending of packets to access device 104, access device 104 may distribute specific routes to one or more gateways 102 (not shown) that are the next hop for access 104 to reach external network 208. In some embodiments, access device 104 may distribute virtual routes to gateways 102 that are specific routes to reach access device 104. Then, gateways 102 use the virtual routes to send traffic to access device 104. Upon receiving the traffic, access device 104 selects which workload 400 should process the traffic using a load balancing process. Access device 104 sends the traffic to the selected workload at another address for the workload via a path 406. For example, access device 104 may select the workload at the IP address of 10.30.1.21 to process the flow. Alternatively, access device 104 may select the workload at the IP address of 10.30.1.22 to process the flow, such as if the load of the other workload is higher.

When workloads 400 send traffic in the south-north direction, the packets are sent through edge services gateway 402 via a path 408. That is, the south-north traffic does not go through access device 104. The south-north traffic may be sent as described in FIG. 2.

Accordingly, access device 104 may not route south-north traffic. In this configuration, access device 104 may not need to receive specific routes from gateways 102 because access device 104 is not routing south-north packets to gateways 102. However, access device 104 advertises specific routes to gateways 102 such that gateways 102 can send north-south traffic to access device 104. The configuration to only send the default route to access device 104 avoids unnecessary entries in route table 206-4 and unnecessary communication. It is noted that access device 104 might not need the default route from gateways 102 at all because access device 104 does not need to reach gateways 102. In this case, further capabilities may be defined to cause gateways 102 to not send any routes while access device 104 sends specific routes. In this case, gateways 102 may set a filter to not send any routes. However, the exchange of capabilities as discussed herein may be used to send specific routes from access device 104 to gateways 102 and receive a default route from gateways 102 at access device 104.

The above configurations may use the following capabilities to set the desired configuration to advertise routes.

Initial Configuration of Capability

Figure 5:
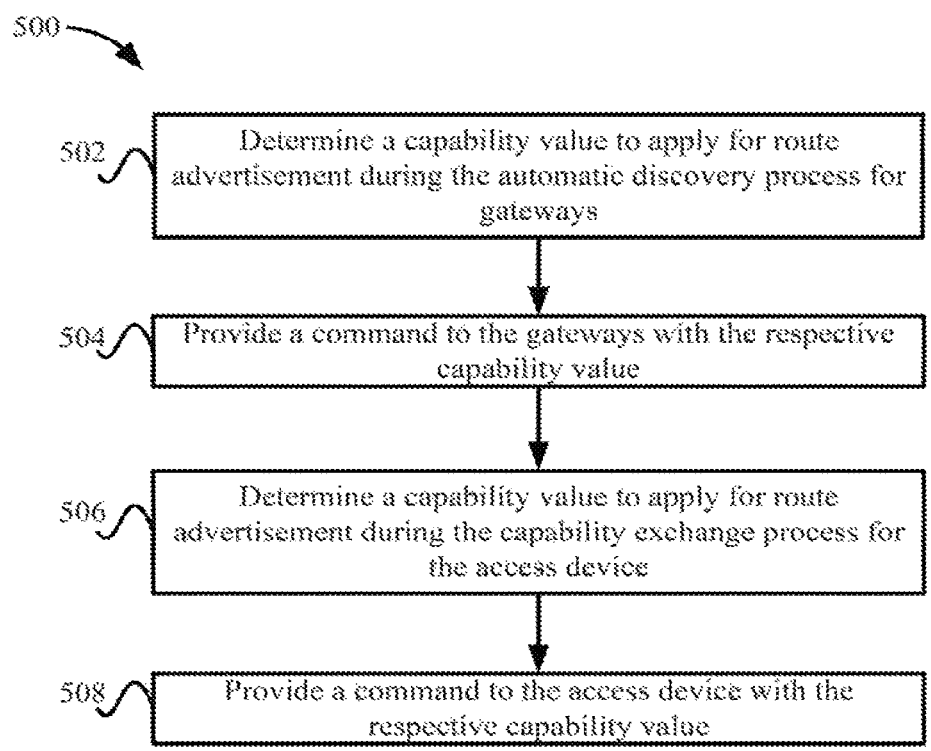
FIG. 5 depicts a simplified flowchart of a method for configuring gateways and the access device with a capability value according to some embodiments.

To configure the above behavior to advertise routes, gateways 102 and access devices 104 may be initially configured with the appropriate capability value. A management system (not shown) may perform the configuration. FIG. 5 depicts a simplified flowchart 500 of a method for configuring gateways 102 and access device 104 with a capability value according to some embodiments. At 502, the management system may determine a capability value to apply for route advertisement during the automatic discovery process for gateways 102. As discussed above, gateways 102 may be configured with a capability value of a first value of "default route originate", which may be a value of "1".

At 504, the management system may send a command to gateways 102 with respective capability value and also set routing protocol applications 108 in gateways 102 to perform the capability exchange process. For example, the management system may broadcast a command each gateway 102. This allows the configuration of the capability value on each routing protocol application 108 with a single command, but individual commands for specific gateways 102 may also be used. This configuration may be performed before the automatic discovery process starts.

At 506, the management system determines a capability value to apply for route advertisement during the capability exchange process for access device 104. As discussed above, the capability value may be set to a second value of "2" for the capability of "default route receive". At 508, the management system sends a command to routing protocol application 108-4 of access device 104 with the respective capability value and configures routing protocol application 108-4 to perform the capability exchange process.

Routing protocol applications 108 store the respective capability parameter value that is received from the management system for use in the capability exchange process. This initial configuration of the capacity values does not configure routing protocol applications 108 to communicate with specific gateways 102 or access devices 104. The configuration of the route advertisement settings depends on the automatic capability exchange of neighbors on network segments as discussed below.

Capability Communication

Figure 6:
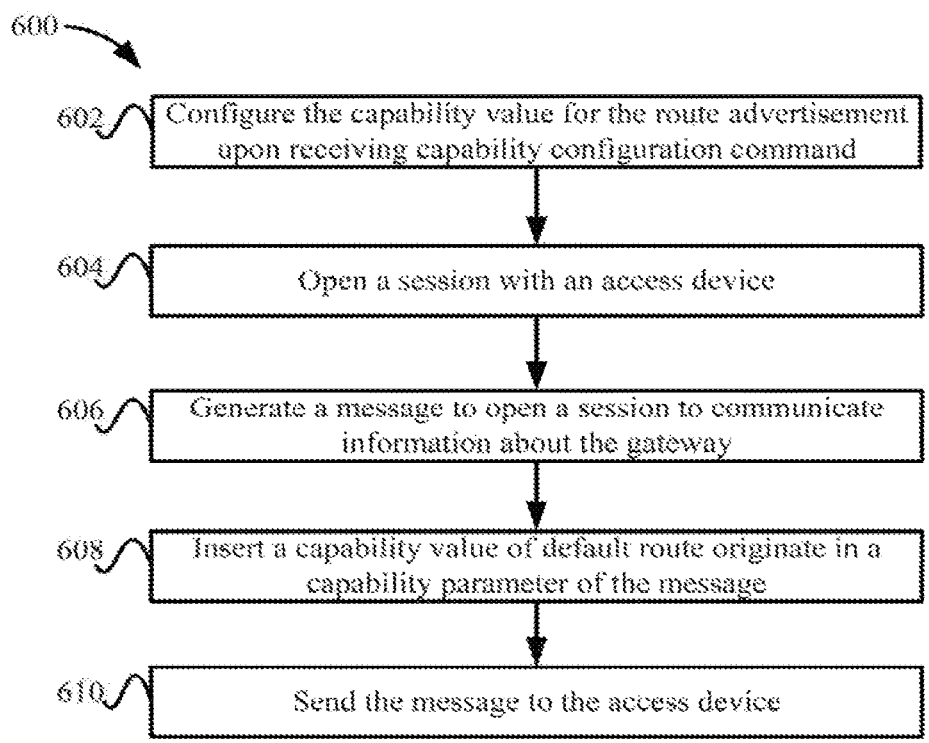
FIG. 6 depicts a simplified flowchart of a method for performing the capability exchange process at a gateway according to some embodiments.

FIG. 6 depicts a simplified flowchart 600 of a method for performing the capability exchange process at gateway 102 according to some embodiments. At 602, routing protocol application 108 at gateway 102 configures the capability value for route advertisement upon receiving the capability configuration command. When configured to automatically discover neighbors, gateway 102 may discover neighbors on a network segment and open a session to exchange information about reachable networks, which may include the routes to use in addition to other network attributes. Although the following process is described, the automatic capability exchange may occur at other times. At 604, gateway 102 may open a session with access device 104, which is a Transfer Control Protocol (TCP) session, but may use other protocols. At 606, gateway 102 generates a message to open a session with access device 104 to communicate information about gateway 102. For example, Border Gateway Protocol uses an Open message to communicate information about gateway 102, such as the version of BGP being used, an IP address of gateway 102, and other information about the connection. The information in the Open message is required to be negotiated and accepted by both gateway 102 and access device 104 before any routing information can be exchanged. When generating the message, at 608, routing protocol application 108 in gateway 102 may insert the capability value in the Open message for setting the route advertisement configuration. For example, routing protocol application 108 in gateway 102 inserts the first value of "1" in a capability parameter of the Open message to set the capability value of "default route originate" for gateway 102. In some embodiments, the Open message includes a capability parameter in which capabilities of a respective device could be inserted. Although an Open message is discussed, the capability value may be inserted in other messages, and at other times during a communication between gateway 102 and access device 104. At 610, routing protocol application 108 in gateway 102 sends the message to access device 104.

Figure 7:
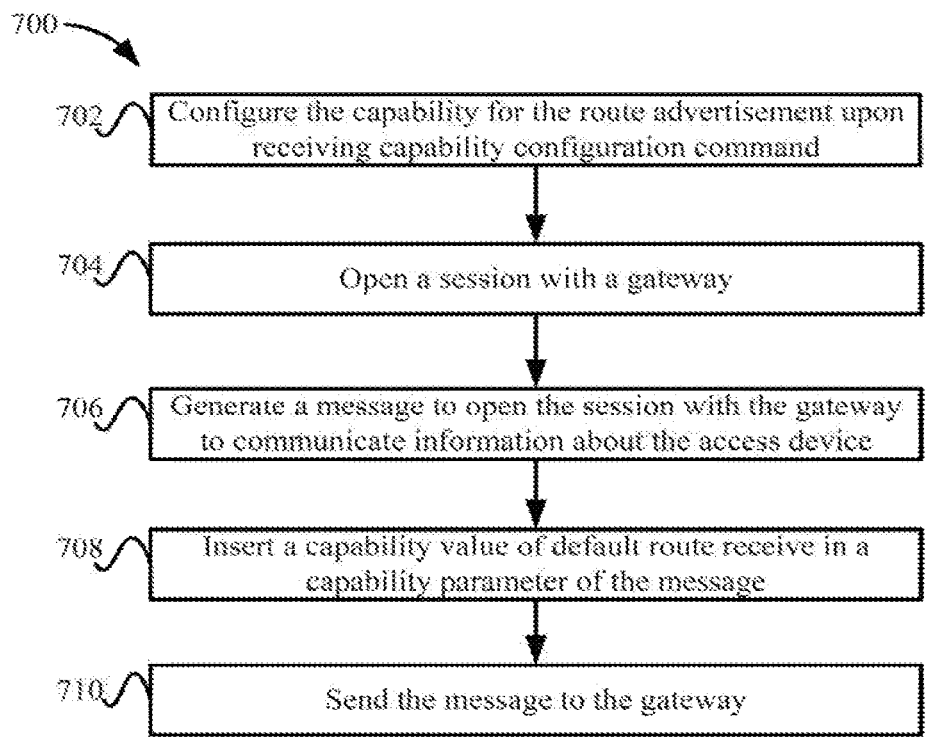
FIG. 7 depicts a simplified flowchart of a method for performing the capability exchange process at the access device according to some embodiments.

A routing protocol application 108-4 in access device 104 may also generate an Open message that includes information required by the negotiation to open the session with gateway 102. FIG. 7 depicts a simplified flowchart 700 of a method for performing the capability exchange process at access device 104 according to some embodiments. At 702, routing protocol application 108-4 at access device 104 configures the capability value for the route advertisement upon receiving the capability configuration command. At 704, routing protocol application 108-4 at access device 104 participates in opening the session with gateway 102. At 706, routing protocol application 108-4 at access device 104 generates a message to open a session with gateway 102 to communicate information about access device 104. For example, routing protocol application 108-4 at access device 104 also sends an Open message with details about access device 104. In the Open message, at 708, routing protocol application 108-4 at access device 104 may insert the capability value in the capability parameter. For example, routing protocol application 108-4 at access device 104 inserts the first value of "2" in a capability parameter of the Open message to set the capability of "default route receive" for access device 104. At 710, routing protocol application 108-4 at access device 104 sends the message to gateway 102.

Figure 8:
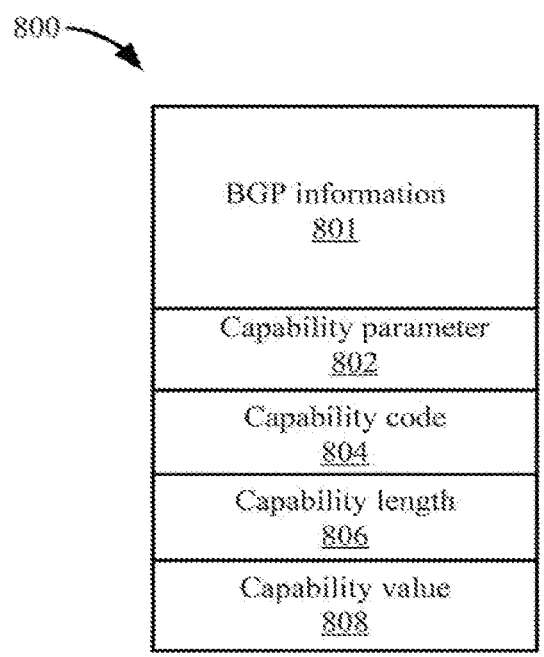
FIG. 8 depicts an example of an Open message that includes a capability parameter according to some embodiments.

FIG. 8 depicts an example of an Open message 800 that includes a capability parameter 802 according to some embodiments. The Open message is used to open a BGP session and contains information about the device in a BGP information section 801. The Open message also includes a capability parameter to communicate different capabilities that are supported to a neighbor. If supported by the neighbor, both neighbors may use the capability. The parameter may be in the format of a type, length, value of <Capability Code, Capability Length, Capability Value>, but other formats may be used. As shown, a capability parameter 802 may include the values of a capability code 804, a capability length 806, and a capability value 808. Capability code 804 may be a code for the route advertisement configuration. The capability parameter may be used to negotiate multiple different capabilities and the capability code is used to distinguish between which capability is being negotiated. A capability length 806 indicates the length of the capability value of a capability value 808. As discussed above, capability value 808 may be restricted to a value of "1" for default route originate and a value of "2" for default route receive. Although these values are described, other values may be appreciated.

Capability Configuration

Figure 9:
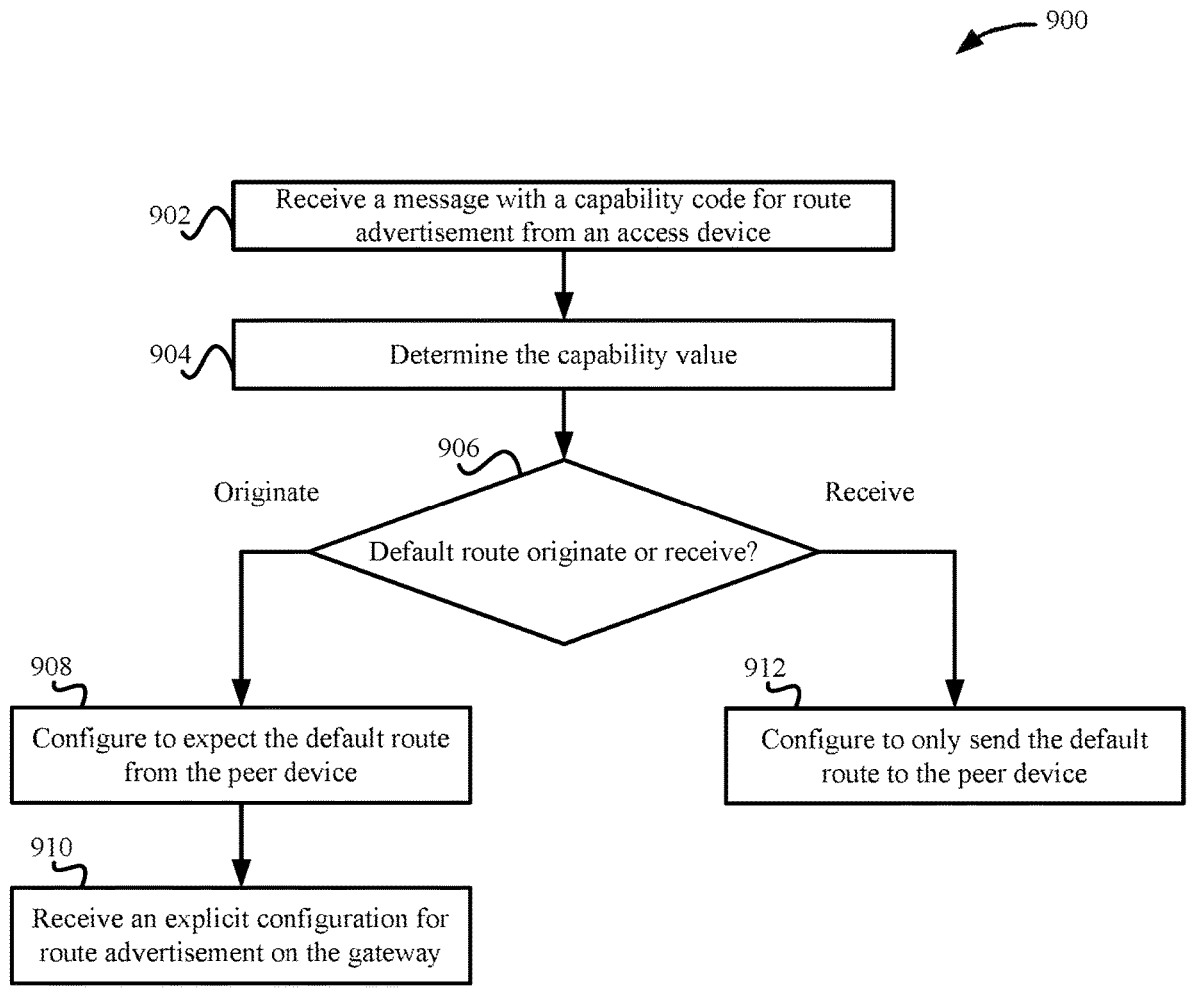
FIG. 9 depicts a simplified flowchart of a method for configuring a route advertisement setting at the gateway according to some embodiments.

FIG. 9 depicts a simplified flowchart 900 of a method for configuring a route advertisement setting at gateway 102 according to some embodiments. At 902, a routing protocol application 108 in gateway 102 receives a message with a capability code for route advertisement from an access device. At 904, routing protocol application 108 in gateway 102 determines the capability value in the capability parameter. Then, at 906, routing protocol application 108 in gateway 102 determines whether the capability value is a first value for "default route originate" or a second value for "default route receive".

If the capability value is default route originate, at 908, routing protocol application 108 in gateway 102 may expect the default route from access device 104 and not specific routes. In some embodiments, this may not be the desired configuration. In this case, the automatic configuration may not work, and at 910, an explicit configuration may be received to configure gateway 102 to advertise the default route and not specific routes.

If the capability value is for "default route receive", at 912, routing protocol application 108 in gateway 102 configures a filter to only send the default route to access device 104. For example, from the capability value, gateway 102 knows only to send the default route to access device 104. Gateway 102 may be configured with only send the default route to the identification information (e.g., an IP address) of access device 104, but other methods may be used. The configuration may be performed in different ways, such as in software, to not send any specific routes, such as the routes that are received to reach devices in the external network from being sent to access device 104, from being sent to access device 104. Accordingly, gateway 102 only sends the default route to reach gateway 102 to access device 104. Then, after the connection is established, gateway 102 may receive specific routes from access device 104.

Figure 10:
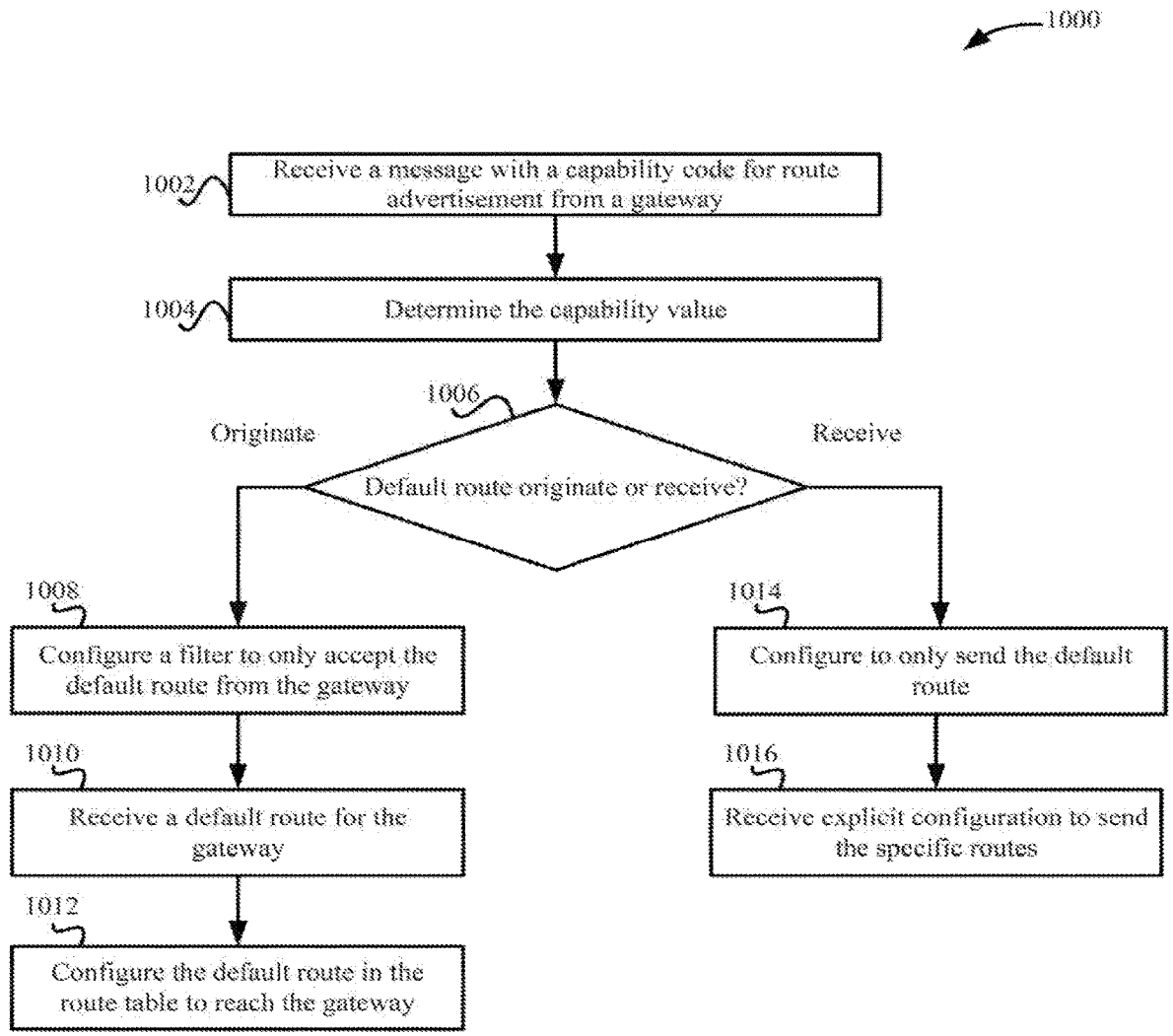
FIG. 10 depicts a simplified flowchart of a method for configuring a route advertisement setting at the access device according to some embodiments.

FIG. 10 depicts a simplified flowchart 1000 of a method for configuring a route advertisement setting at access device 104 according to some embodiments. At 1002, routing protocol application 108-4 at access device 104 receives a message with a capability code for route advertisement from a routing protocol application 108 in gateway 102. At 1004, routing protocol application 108-4 at access device 104 determines the capability value in the capability parameter. Then, at 1006, routing protocol application 108-4 at access device 104 determines whether the capability value is a first value for "default route originate" or a second value for "default route receive".

At 1008, if the capability value is default route originate, routing protocol application 108-4 at access device 104 may configure a filter to only accept the default route from gateway 102. If the value is default route originate, this means that gateway 102 will only send the default route to reach gateway 102 and not specific routes to reach any external devices. Accordingly, access device 104 may set a filter to filter out any specific routes. In other embodiments, access device 104 may not need to perform any action in this case because this is the capability it expects from gateway 102 to configure route advertisement. Accordingly, after the negotiation is finished, at 1010, access device 104 receives a default route from gateway 102. Then, at 1012, access device 104 configures the default route in route table 206-4 to reach gateway 102.

If the capability value is "default route receive", then this indicates that access device 104 should only send the default route and not specific routes to gateway 102. At 1014, access device 104 configures itself to only send the default route to gateway 102. However, this may not be the desired behavior and further actions may be taken. For example, at 1016, access device 104 may be explicitly with a configuration to send the specific routes.

Conclusion

Accordingly, gateway 102 and access device 104 may automatically communicate to configure settings for the advertisements of routes using capability values. The configuration of capability values for access device 104 and gateways 102 may be performed; however, an administrator does not need to specifically configure an access device to communicate with a specific gateway, or vice versa, to configure the route advertisement settings. That is, gateway 102 does not need to be specifically configured on how to advertise routes with a specific access device, or access device 104 does not need to be specifically configured to send the correct filter to gateway 102. The negotiation may be performed during an automatic capability exchange process, which will set the route advertisement configuration correctly between access device 104 and gateway 102. Accordingly, manual intervention after setting the capability values for access device 104 and gateway 102 may be avoided. When an access device 104 communicates with multiple gateways 102, avoiding manual configuration is time saving and also reduces errors.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising: inserting, by a gateway device, a first value for a capability in a first message that is used in a process to automatically exchange capability values with a gateway device, wherein the first value for the capability indicates the gateway device requires a default route to reach the access device as a next hop for sending a packet to a destination; sending, by the gateway device, the first message to the access device; receiving, by the gateway device, a second value for the capability in a second message from the access device, the second value indicating the access device will receive the default route from the gateway device; and storing the default route in a route table.

2. The method of claim 1, wherein the default is used to reach the access device when no other specific routes match a destination of a packet in the route table.

3. The method of claim 1, wherein the first message and the second message are sent during a session establishment between neighbors in a network segment.

4. The method of claim 1, wherein the access device configures itself to only receive the default route from the gateway device based on receiving the first value in the first message.

5. The method of claim 1, further comprising: receiving a command to configure the gateway device with the capability of the first value, wherein the gateway device inserts the first value in the first message automatically after receiving the command.

6. The method of claim 5, further comprising: sending, by the gateway device, the first message to multiple access devices that can send the packet to the destination as the next hop, wherein the multiple access devices are configured to receive the default route from the gateway device; and receiving, by the gateway device, a second value for the capability in a second message from the multiple access devices, the second value indicating the multiple access devices will receive the default route.

7. The method of claim 1, wherein: the gateway receives a packet from the access device, the gateway device selects a destination for the packet, and the gateway device does not process a packet sent from the destination to the access device.

8. A non-transitory computer-readable storage medium containing instructions, that when executed, control a default route originate device to be operable for: inserting, by the default route originate device, a first value for a capability in a first message that is used in a process to automatically exchange capability values with a default route receive device, wherein the first value for the capability indicates the default route originate device requires a default route to reach the default route receive device as a next hop for sending a packet to a destination; sending, by the default route originate device, the first message to the default route receive device; receiving, by the default route originate device, a second value for the capability in a second message from the default route receive device, the second value indicating the default route receive device will receive the default route from the default route originate device; and storing the default route in a route table.

9. The non-transitory computer-readable storage medium of claim 8, wherein the default is used to reach the second computing device when no other specific routes match a destination of a packet in the route table.

10. The non-transitory computer-readable storage medium of claim 8, wherein the first message and the second message are sent during a session establishment between neighbors in a network segment.

11. The non-transitory computer-readable storage medium of claim 8, wherein the default route receive device configures itself to only receive the default route from the default route originate device based on receiving the first value in the first message.

12. The non-transitory computer-readable storage medium of claim 8, further operable for: receiving a command to configure the default route originate device with the capability of the first value, wherein the default route originate device inserts the first value in the first message automatically after receiving the command.

13. The non-transitory computer-readable storage medium of claim 12, further operable for: sending, by the default route originate device, the first message to multiple default route receive devices that can send the packet to the destination as the next hop, wherein the multiple default route receive devices are configured to only receive the default route from the default route originate device; and receiving, by the default route originate device, a second value for the capability in a second message from the multiple default route receive devices, the second value indicating the multiple default route receive devices will only receive the default route.

14. The non-transitory computer-readable storage medium of claim 8, wherein: the default route originate device receives a packet from the default route receive device, the default route originate device selects a destination for the packet, and the default route originate device does not process a packet sent from the destination to the default route receive device.

15. A method comprising: inserting, by a gateway device, a first value for a capability in a first message that is used in a process to exchange capability values with an access device, the first value indicating the gateway device will send a default route to reach the access device as a next hop for sending a packet to a destination; sending, by the gateway device, the first message to the access device; receiving, by the gateway device, a second value for the capability in a second message from the access device, wherein the second value for the capability indicates the access device requires the default route to reach the gateway device; and setting, by the gateway device, a configuration to send the default route to reach the access device.

16. The method of claim 15, wherein the configuration only sends the default route to the second computing device.

17. The method of claim 15, wherein the first message and the second message are sent during a session establishment between neighbors in a network segment.

18. The method of claim 15, further comprising: receiving, from the access device, specific routes to reach other computing devices using the second computing device as the next hop.

19. The method of claim 15, further comprising: receiving a command to configure the gateway device with the capability of the first value, wherein the gateway device inserts the first value in the first message automatically after receiving the command.

20. The method of claim 15, wherein the configuration is set automatically upon receiving the second value for the capability.

* * * * *